US008898019B2

(12) United States Patent
Adams et al.

(10) Patent No.: US 8,898,019 B2
(45) Date of Patent: Nov. 25, 2014

(54) LOW-POWER SATELLITE-TIMED SEISMIC DATA ACQUISITION SYSTEM

(75) Inventors: Robbin B. Adams, Richmond, TX (US); Bhasker Vajapeyam, Sugar Land, TX (US); Sridhar Vajapey, legal representative, San Jose, CA (US); Jesus Eduardo Prado, Sugar Land, TX (US); Paul E. Carroll, Houston, TX (US); James Michael Hallaman, Sugar Land, TX (US)

(73) Assignee: Geospace Technologies, LP, Houston, TX (US)

( * ) Notice: Subject to any disclaimer, the term of this patent is extended or adjusted under 35 U.S.C. 154(b) by 541 days.

(21) Appl. No.: 12/284,192

(22) Filed: Sep. 19, 2008

(65) Prior Publication Data

US 2010/0017139 A1 Jan. 21, 2010

Related U.S. Application Data

(60) Provisional application No. 60/974,266, filed on Sep. 21, 2007.

(51) Int. Cl.
| | |
|---|---|
| G01V 1/22 | (2006.01) |
| G06F 19/00 | (2011.01) |
| G01V 1/16 | (2006.01) |
| G01V 1/00 | (2006.01) |

(52) U.S. Cl.
CPC . *G01V 1/003* (2013.01); *G01V 1/22* (2013.01)
USPC ......................................... 702/14; 379/106.1

(58) Field of Classification Search
CPC ...................................................... G01V 1/28
USPC .............................................................. 702/14
See application file for complete search history.

(56) References Cited

U.S. PATENT DOCUMENTS

| | | | |
|---|---|---|---|
| 4,281,403 | A | 7/1981 | Siems et al. |
| 4,493,063 | A | 1/1985 | Tims et al. |

(Continued)

FOREIGN PATENT DOCUMENTS

| | | |
|---|---|---|
| CN | 1417593 | 5/2003 |
| EP | 0113220 | 7/1984 |

(Continued)

OTHER PUBLICATIONS

Ref Tek, "Third Generation Broadband Seismic Recorder," Rev. 3.4 Copyright Aug. 2005, Refraction Technology, Inc.

(Continued)

*Primary Examiner* — Patrick Assouad
*Assistant Examiner* — Haidong Zhang
(74) *Attorney, Agent, or Firm* — Gary L. Bush; Andrews Kurth LLP (57) ABSTRACT

A recording system and method for conducting seismic surveys including cordless battery-operated digital recorders, each employing an integral global positioning system receiver that is only periodically enabled for the purpose of establishing synchronized acquisition clock signals among all the recorders. The satellite receiver adjustment cycle is varied depending on past acquisition clock accuracy and temperature changes. A time stamp is recorded with the digitized seismic data in non-volatile memory. The memory is sized to allow extended periods of operation. Each recorder preferably includes a low-power system timer that may be used as a timer to remotely turn on and off the recorders according to a pre-programmed schedule to conserve power when the system is not in use. Electronic components are idled or de-energized when not needed.

5 Claims, 5 Drawing Sheets

(56) References Cited

U.S. PATENT DOCUMENTS

| | | | |
|---|---|---|---|
| 4,589,100 | A | 5/1986 | Savit |
| 4,725,992 | A | 2/1988 | McNatt et al. |
| 4,800,538 | A | 1/1989 | Passmore et al. |
| 4,809,005 | A | 2/1989 | Counselman |
| 4,879,696 | A | 11/1989 | Kostelnicek et al. |
| 5,243,469 | A * | 9/1993 | Hackett et al. .................... 360/6 |
| 5,245,647 | A | 9/1993 | Grouffal et al. |
| 5,416,808 | A * | 5/1995 | Witsaman et al. ............ 375/356 |
| 5,510,797 | A | 4/1996 | Abraham et al. |
| 5,548,562 | A | 8/1996 | Helgerud et al. |
| 5,629,626 | A | 5/1997 | Russell et al. |
| 5,650,981 | A * | 7/1997 | Jacobsen et al. ................. 367/19 |
| 5,724,241 | A | 3/1998 | Wood et al. |
| 5,754,449 | A * | 5/1998 | Hoshal et al. .................. 702/187 |
| 5,978,313 | A | 11/1999 | Longaker |
| 6,002,339 | A | 12/1999 | Norris |
| 6,002,640 | A * | 12/1999 | Harmon .......................... 367/38 |
| 6,070,129 | A | 5/2000 | Grouffal et al. |
| 6,188,962 | B1 | 2/2001 | Morgan et al. |
| 6,219,620 | B1 | 4/2001 | Park et al. |
| 6,226,601 | B1 | 5/2001 | Longaker |
| 6,253,156 | B1 | 6/2001 | Bui-Tran et al. |
| 6,459,654 | B1 | 10/2002 | Bary et al. |
| 6,553,316 | B2 | 4/2003 | Bary et al. |
| 6,590,525 | B2 | 7/2003 | Yule et al. |
| 6,701,133 | B1 | 3/2004 | Bennett et al. |
| 6,724,319 | B1 | 4/2004 | Knaack et al. |
| 6,932,185 | B2 | 8/2005 | Bary et al. |
| 6,977,867 | B2 | 12/2005 | Chamberlain |
| 7,016,260 | B2 | 3/2006 | Bary |
| 7,117,094 | B2 | 10/2006 | Fenton |
| 7,124,028 | B2 | 10/2006 | Ray et al. |
| 7,142,154 | B2 | 11/2006 | Quilter et al. |
| 7,224,642 | B1 | 5/2007 | Tran |
| 7,224,682 | B2 | 5/2007 | Kuroda et al. |
| 7,269,095 | B2 | 9/2007 | Chamberlain et al. |
| 7,298,671 | B2 | 11/2007 | Brinkmann et al. |
| 7,299,133 | B2 | 11/2007 | Duncan et al. |
| 7,526,386 | B2 | 4/2009 | Fenton |
| 2004/0105341 | A1 | 6/2004 | Chamberlain et al. |
| 2004/0105533 | A1* | 6/2004 | Iseli ......................... 379/106.01 |
| 2004/0257913 | A1 | 12/2004 | Ray et al. |
| 2005/0027453 | A1 | 2/2005 | Fort et al. |
| 2005/0033519 | A1 | 2/2005 | Fenton |
| 2005/0047277 | A1* | 3/2005 | Chamberlain et al. ........ 367/136 |
| 2005/0232078 | A1 | 10/2005 | Burkholder et al. |
| 2005/0276162 | A1 | 12/2005 | Brinkmann et al. |
| 2006/0009911 | A1 | 1/2006 | Burkholder et al. |
| 2006/0155758 | A1 | 7/2006 | Arnegaard et al. |
| 2006/0203614 | A1* | 9/2006 | Harmon .......................... 367/57 |
| 2006/0208169 | A1 | 9/2006 | Breed et al. |
| 2006/0212226 | A1 | 9/2006 | Ray et al. |
| 2007/0103271 | A1* | 5/2007 | King et al. .................. 340/5.72 |
| 2007/0198207 | A1 | 8/2007 | Heidebrecht |
| 2007/0286022 | A1 | 12/2007 | Bull et al. |
| 2008/0021658 | A1 | 1/2008 | Pavel et al. |
| 2008/0049550 | A1* | 2/2008 | Fleure et al. .................... 367/14 |
| 2008/0082701 | A1 | 4/2008 | Pavel et al. |
| 2008/0189044 | A1 | 8/2008 | Chamberlain et al. |

FOREIGN PATENT DOCUMENTS

| | | |
|---|---|---|
| JP | 2002-107459 | 4/2002 |
| JP | 2002-122447 | 4/2002 |
| WO | WO 98/13966 | 4/1998 |

OTHER PUBLICATIONS

Jack, Ian, "Seismic System 2000," BP Exploration Operating Co., Uxbridge, U.K., The Lading Edge Oct. 1996.

Asch, Gunter. "6 Seismic Recording Systems." Manual of Seismological Observatory Practice. ( Sep. 13, 2000) Accessed Web. Jul. 15, 2009. <http://seismo.um.ac.ir/education/Seismic%20Recorders.htm>.

Beims, Tim. "Array of New Technologies, Improved Business Conditions Transforming Land Seismic." The American Oil & Gas Reporter (Jul. 2006).

Elson, Jeremy, Lewis Girod and Deborah Estrin. Fine-Grained Network Time Synchronization Using Reference Broadcasts. Proceedings of the Fifth Symposium on Operating Systems Design and Implementation (OSDI 2002) Boston, MA. Dec. 2002. UCLA Computer Science Technical Report 020008.

Hayskov, Jens, and Gerardo Alguacil. Instrumentation in Earthquake Seismology. vol. 22, pp. 113-149. Dordrecht, the Netherlands: Springer, 2004.

Refraction Technology, Inc.'s Brochure Rev. 3.4: "REFTEK Unshakable: Miniature Seismic Recorder Model 125A-01" Plano, Texas (2007).

Refraction Technology, Inc.'s Brochure Rev. 3.4: "REFTEK Unshakable: Third Generation Broadband Seismic Recorder Model 130-01" Plano, Texas (2007).

Kinemetrics, Inc.'s User's Guide: "GPS Timing Systems for Altus Recorder System" Document 302205 Revision C (Mar. 1999).

* cited by examiner

LOW-POWER SATELLITE-TIMED SEISMIC DATA ACQUISITION SYSTEM

CROSS REFERENCE TO RELATED APPLICATION

This application is based upon provisional application 60/974,266 filed on Sep. 21, 2007, the priority of which is claimed.

BACKGROUND OF THE INVENTION

1. Field of the Invention

This invention relates generally to a seismic systems, and more particularly to seismic systems used in the hydrocarbon exploration and mining industries.

2. Description of the Prior Art

Terrestrial seismic data acquisition systems are well known in the art. An array of geophones are positioned across a geographical region, typically in a grid pattern, for measuring seismic vibrations. The precise location of each geophone must be known and is typically ascertained by a separate positioning survey. A seismic vibration source is activated, and the geophone measurements are recorded, sometimes over a period of several hours to several days or weeks, collected, and subsequently processed to determine the structure of the earth at that geographical region.

In many seismic systems, multi-channel digital recorders are connected to a number of input geophone channels for sampling and converting the analog geophone outputs to digital format, which are recorded. It is often preferred that the analog-to-digital conversion occurs in the field close to the geophones to minimize degradation of the low-level geophone signals.

It is necessary to ensure that all of the numerous digitized seismic channels can be precisely correlated to a common time standard for analysis. Sampling time errors result in wrong sets of data being analyzed for each instant of time and are perceived as noise. The noise created by sample timing mismatch is both time and frequency dependent, because the errors created depend on the slew rate of the signal at each sample instant. Large timing errors cause binning problems in depth point processing and result in significant depth errors.

In many prior art seismic recording systems, the seismic channel data are analyzed strictly according to their sequential sampling order, and timing errors are minimized by ensuring simultaneous triggering of all recorders to begin sampling. Triggering the digital recorders may be performed by hard-wired or wireless radio frequency (RF) control.

In hard-wired systems, control and power are provided by cabling that connects the digital recorders to a control interface. This type of system has an additional advantage of having a conductive signal path to transmit seismic data from the numerous digital recorders for central collection, typically at a control vehicle. However, the cabling is heavy, and weight is a significant cost in deploying a seismic system. Also, the cables are subject to damage by being crushed under passing vehicles or being chewed by rodents and livestock, for example.

In wireless systems, the weight of the cabling between digital recorders is eliminated, but the weight savings is offset by batteries used to power the digital recorders and RF receivers used for triggering wireless systems. Wireless systems also typically employ RF transmitters in the digital recorders for transmitting seismic data to a central location for collection and processing. Large wireless seismic survey systems require a significant amount of RF bandwidth and a fairly large antenna at the control vehicle. Radio wave propagation paths may be obstructed by terrain, vegetation or structures. Furthermore, battery life limits the time a system may remain in the field, even in standby conditions, and creates logistical difficulties in deploying large seismic system arrays.

Figure 1:
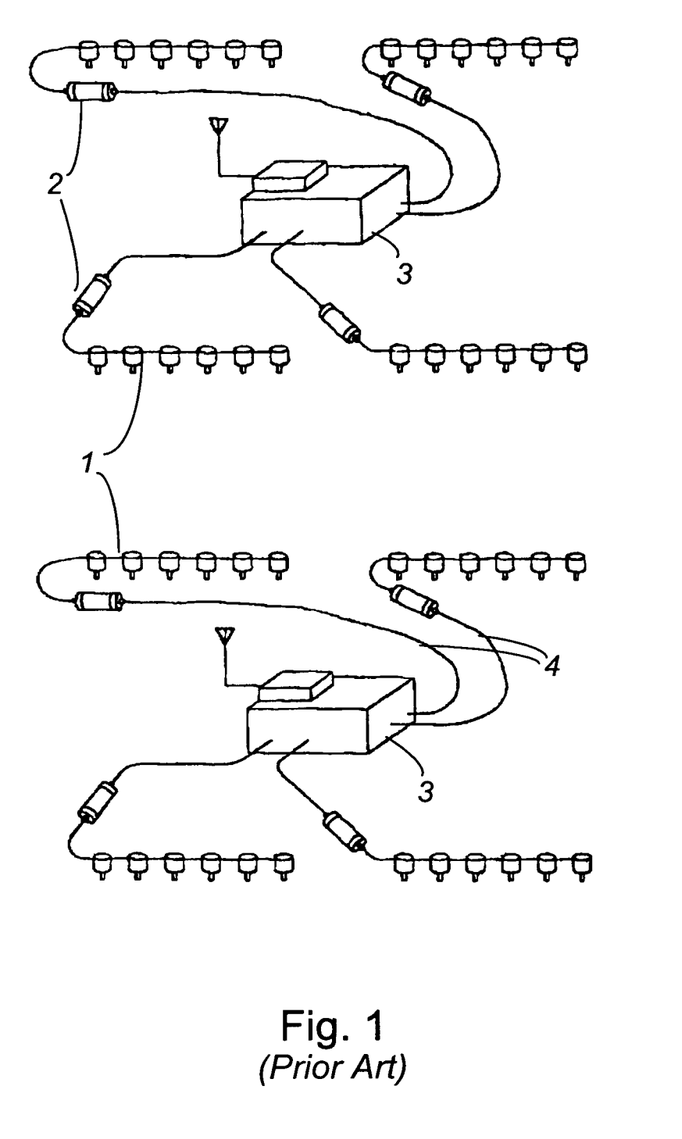
FIG. 1 is a schematic diagram illustrating a prior art wireless seismic data acquisition system showing strings of geophones connected to digitizing modules, which are in turn connected by cabling to remote wireless digital recorders.

FIG. 1 illustrates a "wireless" seismic recording system of prior art in which strings of geophones (1) are connected to multi-channel digitizer modules (2), for example, six geophones per string and four channels per recorder. Because of the low-level signals produced by analog sensors, the digitizer modules (2) are each located in close proximity to their attached geophones. The digitizer modules (2) include preamplifiers and analog-to-digital converters to digitize the geophone signals into digital data. The seismic digital data are then in turn transmitted by the digitizer modules to a data acquisition module (3) via electrical cabling (4). Depending on the telemetry techniques employed, the data acquisition modules (3) may be located a significant distance away from the digitizer modules (2).

In a given survey, a number of data acquisition modules (3) are used, each having its own corresponding digitizer modules (2) and geophone strings (1) to form an independent cell within the wireless system. Two such cells are represented in FIG. 1. Each data acquisition module contains memory for recording the digital seismic data from its corresponding family of digitizer modules, and the data acquisition module supplies power, control, and synchronized clock signals to the digitizer modules. Each data acquisition module has a battery, and it may also include a radio frequency transmitter for broadcasting collected seismic data to a control vehicle, for example. Timing synchronization is maintained between the geophone channels by including a global positioning receiver within each data acquisition module (3). Each data acquisition module (3) continuously processes satellite navigation data to provide a common time standard among the units. Other prior art seismic systems, for example, U.S. Pat. No. 5,978,313 issued to Longaker, U.S. Pat. No. 7,269,095 issued to Chamberlain et al., and U.S. Patent Publication No. 2008/0021658 in the name of Pavel et al., disclose seismic systems that employ satellite navigation system receivers for establishing synchronization among the recording units, but no provision is made for idling the satellite receiver to conserve power.

As the price of oil has increased and the cost of computer processing power has decreased, it is desirable to increase the number of geophones or other sensors used in a survey to cover larger areas and provide higher resolution surveys. For a three dimensional survey, many thousands of geophones or other sensors may be deployed over many square miles. Synchronization, power management, and deployment of digital recorders on this scale can be problematic. Although the data acquisition modules of the system of FIG. 1 are wireless, a large amount of cabling (4), with its inherent disadvantages, is still required between the data acquisition modules (3) and the digitizer modules (2). A wireless system of energy-efficient, high-capacity digital recorders collocated near the geophones with the digitizing circuitry would advantageously reduce the amount of cabling required.

3. Identification of Objects of the Invention

A primary object of the invention is to provide a seismic data acquisition system including field-deployable digital recorders for capturing seismic data that have integral satellite receivers for synchronizing the timing between recorded seismic data from multiple recorders, thus eliminating the cost of deploying traditional timing/triggering systems.

Another object of the invention is to provide a wireless seismic acquisition system wherein the digital recorders are collocated with digitizing electronics near the analog sensors, thus minimizing the volume, weight and cost of cable to deploy and maintain.

Another object of the invention is to provide a wireless digital seismic recorder with an independent acquisition clock circuit that is used to sample and to time stamp recorded seismic data and a satellite receiver that is activated only periodically to adjust the acquisition clock circuit. By not continuously processing satellite navigation signals, power requirements are reduced.

Another object of the invention is to provide an intelligent digital seismic recorder that periodically adjusts a local acquisition clock circuit to a satellite time standard and that measures the acquisition clock drift and temperature changes and adjusts clock cycle times to maximize periods between synchronization while maintaining the acquisition clock circuit within a given error tolerance.

Another object of the invention is to provide a seismic data acquisition system having field-deployable digital recorders that periodically record time stamps with seismic data and that are equipped with large non-volatile memories to eliminate the need for centralized triggering.

Another object of the invention is to provide a seismic data acquisition system arranged for transferring recorded seismic data to collection computers in the field during surveys, after the data is collected.

Another object of the invention is to provide a seismic data acquisition system having field-deployable digital recorders equipped with low-power-consumption electronics and that are designed and programmed to automatically and selectively de-energize or idle system components when not required for use, thus extending the usable time in field and reducing operating costs.

Another object of the invention is to provide a seismic data acquisition system having field-deployable digital recorders which employ dynamic voltage control techniques to lower computer processor power consumption by idling the processor during periods of lower computational demands.

SUMMARY OF THE INVENTION

The objects described above and other advantages and features of the invention are, in a preferred embodiment, incorporated in a seismic recording system that includes cableless battery-operated digital seismic recorders. Each recorder is located with and adapted for connecting to one or more seismic sensors and for digitizing and recording single or multi-channel seismic data from the sensors. Rather than relying on the use of concurrent triggering to ensure multi-channel timing integrity, one or more time stamps are recorded with the digitized seismic data in non-volatile memory. Each recorder may commence recording independently of the others and includes memory of sufficient capacity to allow extended periods of operation.

Each recorder includes its own acquisition clock, processing system, and global positioning system (GPS) receiver for the purpose of establishing synchronization of recorded seismic data among the many recorders typically required for a survey. The processing system is arranged for periodically synchronizing the acquisition clock to a satellite time standard derived by the GPS receiver.

Each recorder preferably includes a low-power system timer that may be used to remotely turn on and off the recorders according to a pre-programmed schedule to conserve power when the system is not in use.

Each recorder also preferably includes a wireless communications link for short range communication with a controller for programming or controlling the recorder in the field. Each recorder also ideally includes a hardwired data port for collecting seismic data and programming the recorder.

The recorder employs low-power electronics and power management techniques. Electronic components are idled or de-energized when not needed.

The invention includes a method for conducting a seismic survey that, according to a preferred embodiment, includes the steps of maintaining the acquisition clock of each recorder in synchronization with the satellite time standard by periodically adjusting the acquisition clock with the recorders' onboard GPS receiver. The satellite receiver is de-energized except when needed for the periodic adjustment of the acquisition clock.

Each recorder tailors the acquisition clock adjustment periods based on measured acquisition clock timing errors and/or temperature drift (which affects the local acquisition clock period). These parameters are monitored by the processing system within each recorder. The processing system adapts the time between each adjustment to the maximum which will keep the local acquisition clock within a given tolerance to the satellite time standard. Because the GPS receiver is only periodically utilized, the method results in lowering the power requirements of the recorder.

BRIEF DESCRIPTION OF THE DRAWINGS

The invention is described in detail hereinafter on the basis of the embodiments represented in the accompanying figures, in which.

DESCRIPTION OF THE PREFERRED EMBODIMENT OF THE INVENTION

Figure 2:
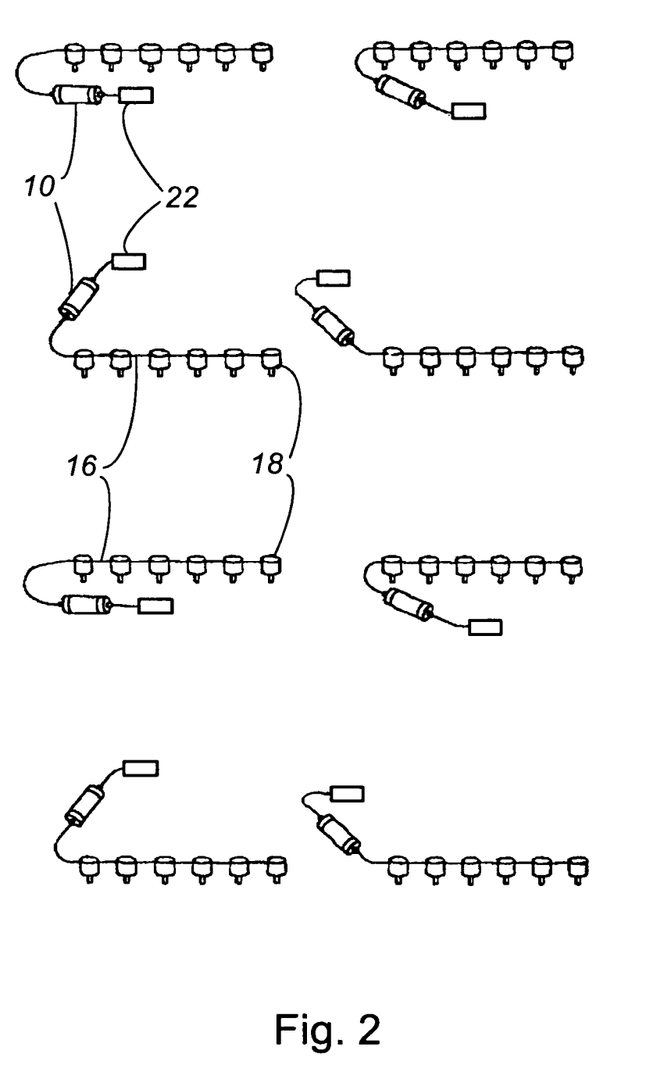
FIG. 2 is a schematic diagram illustrating a low-power satellite-timed seismic data acquisition system according to a preferred embodiment of the invention, showing strings of geophones directly connected to wireless digital recorders that are located in proximity to the geophone strings.

FIGS. 1 and 2 illustrate an identical hypothetical survey site. Forty-eight geophones in eight geophone strings are arrayed over the geographic area to be surveyed. In the prior art seismic system of FIG. 1, two wireless digital recorders 3 are used to record twenty-four geophones each. Eight digitizing modules 2 are located in proximity with the geophone strings for converting the low level analog geophone signals to multiplexed digital data, which is in turn telemetered over cables 4 to the more centrally-located wireless digital recorders 3. In contrast, according to a preferred embodiment of the invention and as shown in FIG. 2, eight wireless digital recorders 10, one for each geophone string 16, 18, are employed. The wireless digital recorders 10 include digitizing circuitry therein and are miniaturized to promote rapid and efficient deployment of the seismic system. In operation, a large number of seismic recorders 10 with associated geophone strings 16 are positioned across the geographical area to be surveyed. Recorder 10 is a simple "place and forget" device that is usually set to record continuously for many days during which the surveys are conducted.

Figure 3:
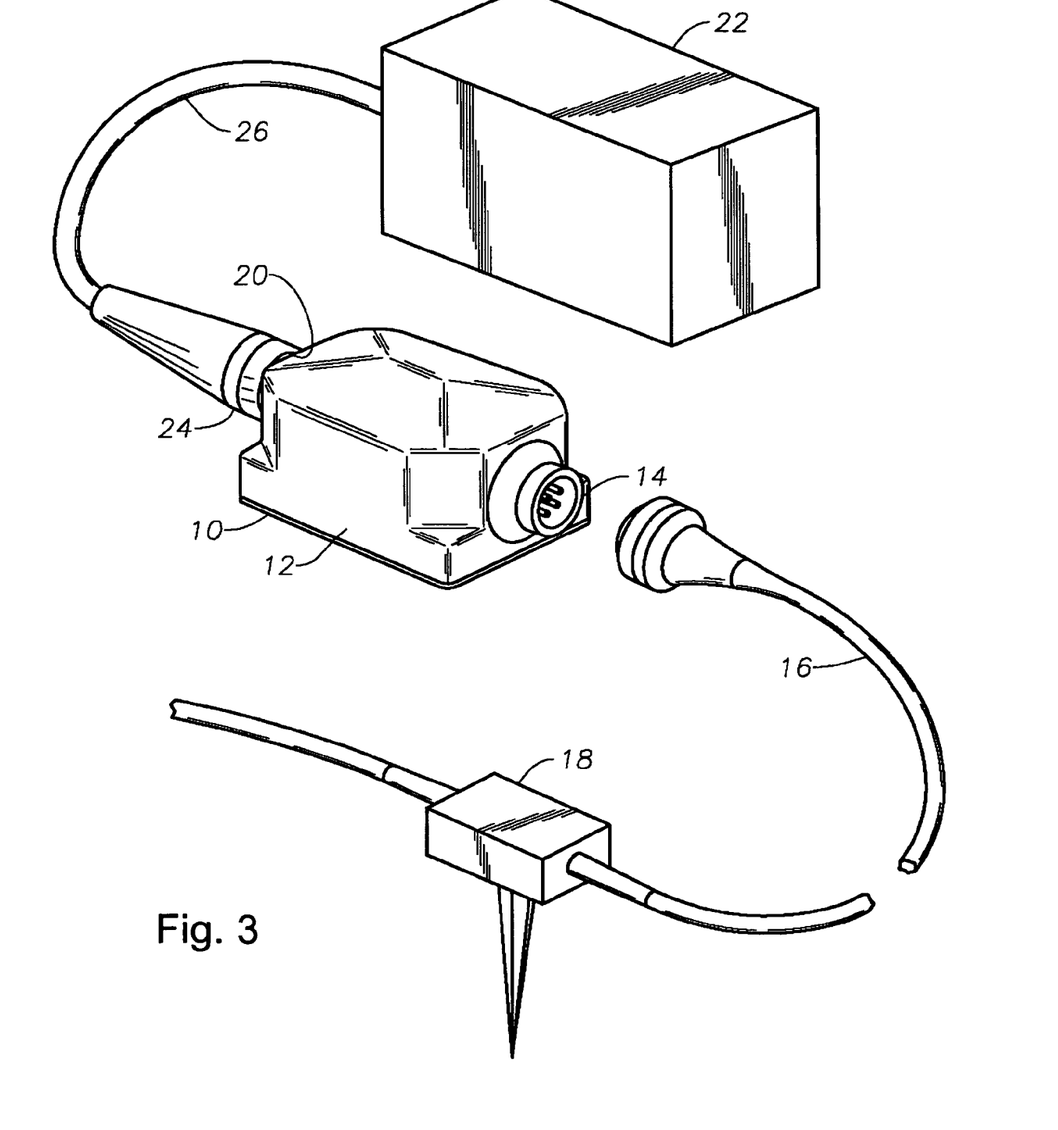
FIG. 3 is a perspective isometric drawing illustrating the basic components of the low-power satellite-timed seismic data acquisition system of FIG. 2, showing a field-deployable digital seismic recorder in a sealed case, a partial string of geophones, and an external extended-life battery.

FIG. 3 illustrates a digital seismic recorder 10 according to a preferred embodiment of the invention. Seismic recorder 10 is housed in a lightweight sealed case 12 designed to withstand expected environmental conditions. Case 12 includes an input connector 14 for connecting one or more strings 16 of geophones 18 (only one geophone is shown). Preferably, seismic recorder 10 includes one or more input channels for connecting one or more seismic sensors at input connector 14. Strings 16 of sensors 18 are well understood by one skilled in the art and are not discussed further herein. Case 12 includes a combination battery/data connector 20. FIG. 3 shows an extended-life battery 22 plugged into the battery/data connector 20 by plug 24 and power cable 26 for providing power to seismic recorder 10 during operation in the field. Battery 22 is preferably a 12 to 15 volt battery. Because battery 22 is located externally of seismic recorder 10, the operator can easily vary the capacity of the battery to provide power for various survey durations. That is, a higher volt-ampere capacity battery provides for longer operation in the field and/or longer recording time.

Figure 4:
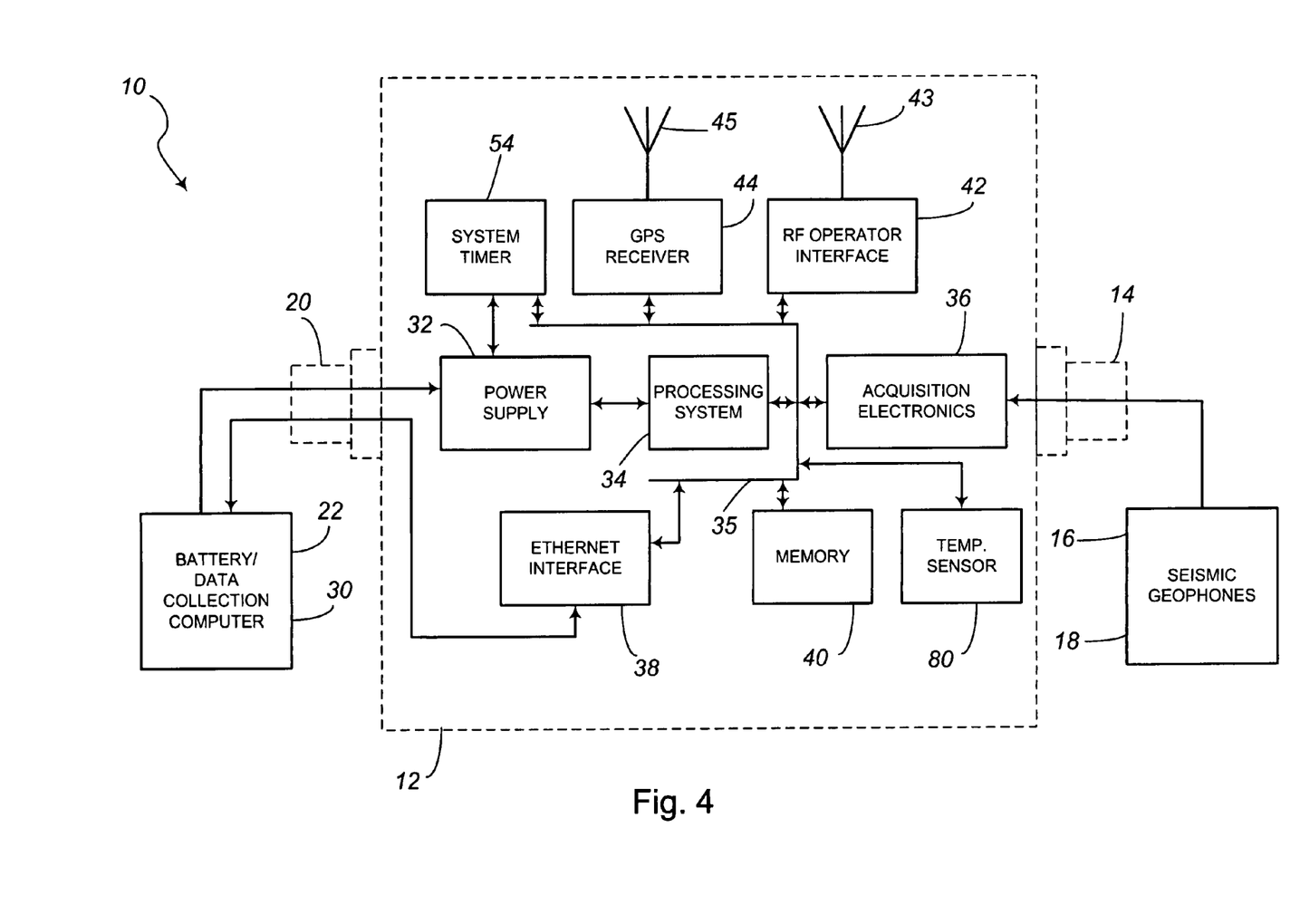
FIG. 4 is a block diagram schematic of the digital seismic recorder of FIG. 3, showing a processing system, power supply, integral global positioning system receiver, data acquisition electronics, radio frequency operator interface, system timer, and Ethernet data port.

FIG. 4 is a functional block diagram showing the internal structure of stand-alone digital seismic recorder 10. The major components of seismic recorder 10 are a power supply module 32, a processing system 34, an acquisition electronics module 36, an Ethernet interface 38, a memory 40, an RF operator interface 42, and a global positioning system (GPS) satellite receiver 44.

Seismic recorder 10 measures the seismic sensor 18 signal (s), converts the measurements to digital data, and stores the data in non-volatile internal memory 40. Synchronized time signals are recorded to time stamp the seismic data, so no centralized triggering is required to control the start of a recording cycle. A large memory 40 preferably enables up to thirty days of seismic data to be stored for a number of geophone channels. For each recorder 10, a system timer 54 with real time clock may be used to turn on or turn off the recording function, or the operator may turn on or turn off the recording function using an RF operator interface 42. Alternatively, system timer 54 may interface directly with power supply 32 for completely turning on and off all of the remaining electronics of recorder 10.

According to the preferred embodiment of the invention, seismic data is collected from recorders 10 during array relocation after the survey is complete and all required data has been collected. Battery 22 is disconnected from battery/data connector 20, and a data collection computer 30 is connected to battery/data connector 20 for downloading the collected data from the internal memory 40 of seismic recorder 10. The data collection computer 30 supplies power to seismic recorder 10 while the data are being extracted. The discharged battery 22 is exchanged for a freshly recharged battery 22, and the digital seismic recorder 10 is moved to a new survey location.

Seismic Recorder 10 is powered by battery 22 at battery/data connector 20, which drives a power supply module 32 for supplying power to the other components of seismic recorder 10. Geophones 18 do not require electrical power to operate.

Figure 5:
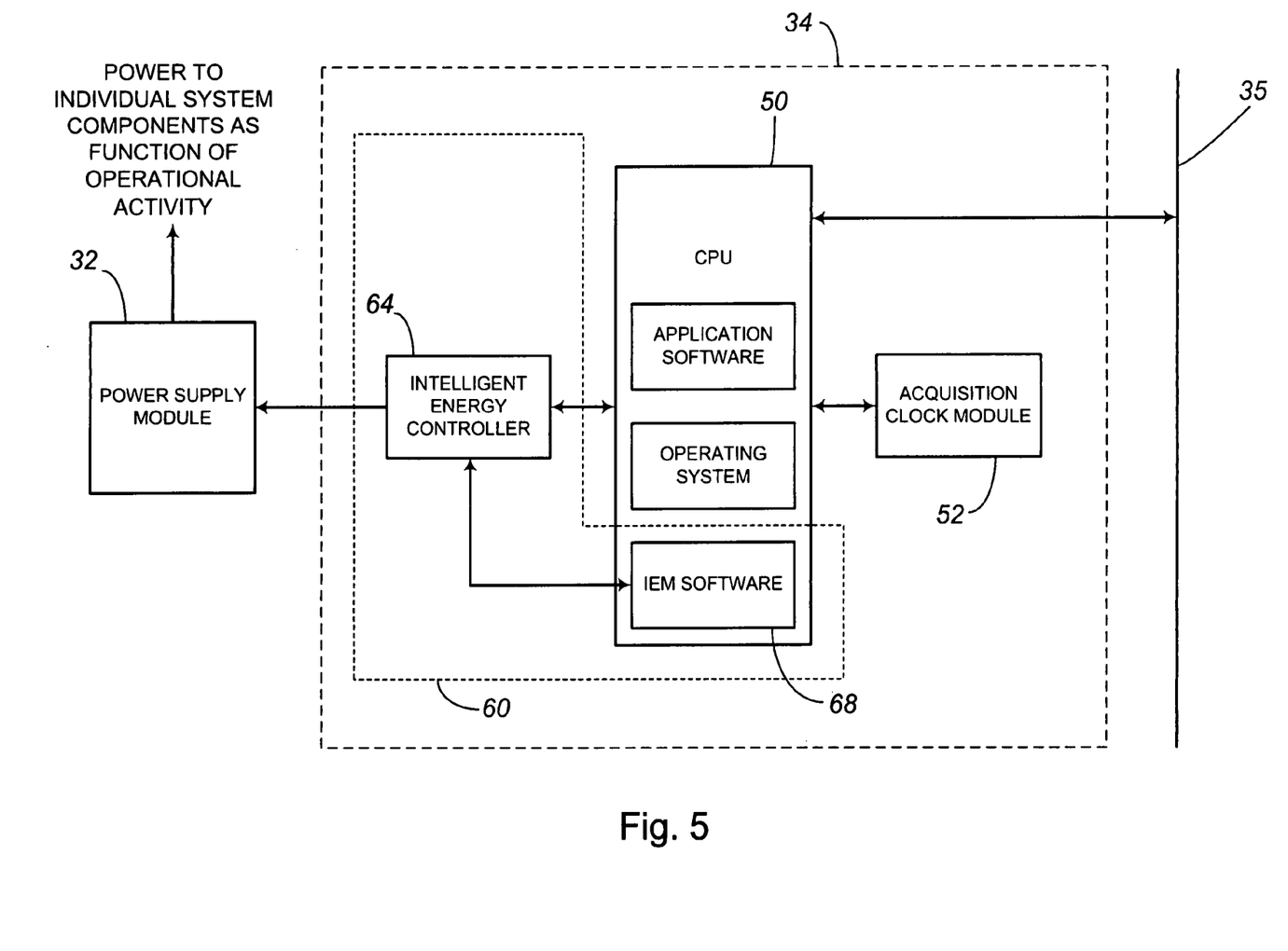
FIG. 5 is a block diagram schematic of the processing system of FIG. 4, showing a central processing unit, an acquisition clock module, and an optional intelligent energy manager.

As illustrated in FIG. 5, in an embodiment where an intelligent energy manager 60 is used, power supply module 32 supplies power to each components only when power is needed by that component.

The processing system 34 controls the overall operation of seismic recorder 10. Processing system 34 interfaces with the acquisition electronics module 36, Ethernet interface 38, memory 40, RF operator interface 42, and GPS receiver 44, preferably via one or more buses or electrical connections 35. Processing system 34 may interface with GPS receiver 44 using National Marine Electronics Association (NMEA) 0183 or 2000 protocols, for example. As illustrated in FIG. 5, the processing system preferably includes a central processing unit (CPU) 50, an acquisition clock module 52, and control logic for interfacing with the other components of recorder 10. The art of interfacing CPUs with peripheral devices is well known to routineers and is therefore not described in detail herein.

CPU 50 is preferably an ARM7 processor with integrated peripherals. The ARM7 processor is a 32-bit reduced instruction set computer (RISC) microprocessor that is designed for use in low-power mobile devices such as cellular telephones. Arm Limited licenses the ARM7 processor for manufacture by a number of semiconductor companies. However, other processors may be used. CPU 50 transfers digitized seismic data from the acquisition electronics module 36 and stores the data in the memory 40. CPU 50 also controls the power to each component in order to save power when the components are not being used.

Acquisition clock module 52 is used to provide synchronized time among all of the many digital seismic recorders 10 used in a seismic survey. Time stamps based on acquisition clock module 52 are periodically recorded in memory 40 along with the seismic data. As described below, the accuracy of acquisition clock module 52 is periodically tested and then adjusted by CPU 50 using the derived time signal output of GPS receiver 44 as the time standard. Acquisition clock module 52 is preferably composed of a digital-to-analog converter (DAC) driving a voltage-controlled temperature-compensated crystal oscillator (VCTCXO). The output of the oscillator is divided down and phase locked by a phase-locked loop (PLL) to 1 pulse per second ("pps"). The loop filter algorithm of the PLL is computed by CPU 50. However, other timing circuits may be used as appropriate.

Referring back to FIG. 4, acquisition electronics module 36 is a single or multi-channel digitizer for receiving and converting a number of analog geophone signals. The digitizer preferably includes a preamplifier and a high-dynamic-range 24-bit analog-to-digital converter (ADC) capable of digitizing the seismic signals at various sample rates and gains. More preferably, the ADC is delta-sigma type having a modulator, digital low-pass filter, and decimation filter. Acquisition electronics module 36 may also include a DAC for producing test signals.

Although recorder 10 is described as including an ADC for digitizing the analog signals provided by conventional geophones, accelerometers, or geophoneaccelerometers, for example, the recorder may also be used with digital seismic sensors. In this case, the ADC would not be necessary, and processing system 34 would employ an all-digital interface with the digital sensors for recording the seismic data in memory 40.

System timer 54 is a is low-power clock circuit similar to one found in a wrist watch having timer and alarm functionality. System timer 54 is used to turn on (awake) and off (asleep) digital seismic recorder 10 or its recording function according to a preset schedule, for example, turning off recorder 10 during nights, weekends and holidays to conserve battery 22 reserves and memory 40 capacity. Turn-on and turn-off times and dates are ideally programmed into a memory, for example, a memory integral with system timer 54 or non-volatile memory 40. System timer 54 may be designed and arranged to be set with the time and date from the GPS receiver 44 whenever battery 22 is first connected.

An Ethernet interface 38 is connected to processing system 34 for downloading seismic data from memory 40 to data collection computer 30 and to upload set-up and recording parameters to memory 40. However, other data port types may be used, such as a universal serial bus (USB), Firewire, or Bluetooth, for example. Ethernet interface 38 preferably provides an external connection at battery/data connector 20.

Memory 40 is connected to processing system 34 for storing the seismic data output by acquisition electronics module 36 and associated time information from acquisition clock module 52, until the data are downloaded to data collection computer 30 via Ethernet interface 38. Memory 40 is preferably non-volatile and of a sufficient capacity for storing seismic data for long periods of time. For example, 4 Gbytes per seismic channel may allow up to 30 days of continuous sampling. A Secure Digital card, commonly known as a SD card or SD memory, is a flash memory card about the size of a postage stamp commonly used for digital cameras, which features high security, speedy data transfer, good storage capacity, and ruggedness. Ideally, a SD card is employed for memory 40. However, other memory devices may be used.

RF operator interface 42 provides a radio frequency link for operator control of seismic recorder 10 and for setup and testing during deployment. RF operator interface 42 is preferably a low-power radio transceiver which operates within a range of 100 meters. An internal RF antenna 43 may be provided within case 12. As RF systems are well known to those skilled in the art, RF operator interface 42 is not described in detail.

GPS receiver 44 is a high-sensitivity receiver that is designed to receive signals from the constellation of GPS satellites. An internal antenna 45 is ideally provided within case 12. Inclusion of satellite antenna 45 inside the case 12 eliminates the need for an antenna amplifier between antenna 45 and receiver 44, which in turn reduces the power requirements of seismic recorder 10 and battery 22. Receiver antenna 45 is optimally located on the same printed circuit board as receiver 44.

Each GPS satellite has an extremely accurate onboard atomic clock and broadcasts a 50 bit per second navigation message. There is only one possible receiver clock signal—a clock signal that is in perfect synchronism with the GPS time held by the atomic clocks in the GPS satellites—that results in trilateration of the received navigation signals from four or more GPS satellites to a single point in space. Receiver 44 calculates this clock signal, referred to herein as the receiver-derived GPS time.

GPS receiver preferably includes a local receiver clock circuit (typically 1 pps). Once GPS receiver 44 has acquired and is tracking four or more satellite signals, receiver 44 calculates GPS time and sets the local receiver clock to the receiver-derived GPS time (or to a receiver-derived UTC time, as described below). GPS receiver 44 is used to adjust acquisition clock module 52 to the derived satellite time standard, so that time-stamped data recorded by each of the individual seismic recorders 10 can be synchronistically analyzed.

Rather than continuously synchronizing acquisition clock 52 to the GPS time in satellite receiver 44, after an adjustment event, acquisition clock module 52 is left to count independently without adjustment, and GPS receiver 44 is temporarily turned off for an adaptive period of time based on past clock accuracy and perceived temperature drift. This is accomplished by processing system 34 ceasing to update the crystal oscillator and turning off receiver 44. The receiver can be left in operation continuously if it is desired, but this increases the power consumption. A temperature sensor 80 may be provided for measuring temperature drift.

The sampling accuracy of seismic signals is affected by the drift in acquisition clock 52 frequency, and the quality of sub-surface image may be adversely affected by significant timing variations of signal sampling. When counting independently, acquisition clock 52 may slowly drift from the 1 pps frequency and lose synchronicity with the time standard. Although temperature compensated clock circuits minimize frequency drift, drift cannot be completely eliminated. Therefore, according to a preferred embodiment, clock frequency drift and timing are maintained within predetermined limits by turning off power to satellite receivers for an adaptive amount of time, depending on the rate of drift. At a later time, timing lock is reestablished by processing system 34 turning on receiver 44, waiting until receiver 44 has derived the satellite time standard, recording the time error, then allowing the PLL to correct the timing error in acquisition clock module 52.

Control algorithms within recorder 10 maintain timing error within limits by adapting the amount of time the satellite receiver is turned off. The control algorithms primarily rely on the measured drift of acquisition clock 52 during the period the satellite receiver was turned off, but other variables, such as temperature change, may be used as input variables. Various algorithms known to those skilled in the art may be implemented for adapting the adjustment duty cycle. Recorder 10 is preferably programmed with default timing error limits.

GPS time, to which the atomic clocks on the GPS satellites are set, is not synchronized with Coordinated Universal Time (UTC) or International Atomic Time (TAI), because GPS time is not corrected (with leap seconds, for example) to match the rotation of the earth. The GPS navigation messages include an almanac component, which is used by most commercial off-the-shelf GPS receivers to relate the receiver-derived GPS time to UTC.

Either GPS time or UTC may be used as the time standard for synchronizing digital recorders 10, as long as use is consistent among the recorders. However, because it takes over twelve minutes for the GPS system to broadcast the complete almanac (which is used by receiver 44 to relate GPS time to UTC), it is preferable that each recorder 10 synchronize acquisition clock 52 to receiver-derived GPS time, instead of receiver-derived UTC. The use of GPS time may shorten the receiver initialization time, thus saving power during the clock adjustment cycles. If receiver-derived UTC time is used to set acquisition clock modules 52, it is preferred that almanac data is stored in memory (either non-volatile memory 40, or a dedicated non-volatile or battery powered CMOS memory within GPS receiver 44, for example) during the GPS receiver off periods, so that receiver initialization time will be minimized. Use of UTC as the time standard may be preferable if receiver 44 is implemented with a commercial off-the-shelf receiver that does not provide a means for accessing the raw receiver-derived GPS time.

GPS receiver 44 is described as including a local receiver clock, which is independent of acquisition clock 52. This arrangement is preferred when using off-the-shelf integrated GPS receiver chips that include an onboard clock whose operation cannot be controlled independently of the GPS receiver function. However, in an alternate embodiment, the GPS receiver local clock and acquisition clock module 52 are one and the same, and GPS receiver 44 can be made to selectively update the clock at the command of processor 50 and be idled or de-energized when not in use without otherwise affecting the clock.

Digital seismic recorder 10 ideally includes several other power saving features:

First, processing system 34 turns off any component that is not being used, even for short periods, to save power. Device interrupts may be used to flag processing system 34 to power up a component for a specific task. For example, acquisition electronics module 36 may hold output in a buffer; when the buffer is near full, an interrupt is sent to processing system 34 to turn on the SD memory 40, transfer the data from the buffer to the memory 40, and then turn off memory 40 again. Other peripherals are powered in a similar manner.

Second, CPU 50 is placed in a low-power idle mode each time it is not needed. In one embodiment, as illustrated in FIG. 5, processing system 34 may optionally include an intelligent energy manager (IEM) 60, which is a combination of hardware and software designed to reduce power and energy consumption by using dynamic voltage control to de-energize all electronic components when they are not needed.

Another feature of recorder 10 is the ability to detect a failure in the clock circuit. Each recorder 10 of the many deployed in a survey independently adjusts its acquisition clock 52 to the satellite time standard. Each recorder 10 will have unique drift characteristics resulting in different adjustment duty cycles. Recorders 10 with acquisition clocks 52 that drift faster than others will turn on their satellite receivers 44 more often than others to keep the sampling error within allowable limits. The time intervals over which the GPS receivers 44 are turned on and off and the temperature changes, et cetera, are recorded in memory 44. When data from the recorders 10 are collected, an algorithm in data collection computer 30 is used to detect those recorders 10 that have acquisition clock circuits 52 which have had high drift rates. In this manner, offending recorder circuits can be easily identified for repair.

The Abstract of the disclosure is written solely for providing the United States Patent and Trademark Office and the public at large with a way by which to determine quickly from a cursory reading the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein.

What is claimed is:

1. A recorder (10) for digitizing and recording geophone seismic signals comprising:
   a processor (50) coupled to at least one seismic sensor (18) so as to collect data;
   a memory (40) coupled to said processor so as to store said data;
   an acquisition clock circuit (52) coupled to said processor so as to pace collection of said data;
   a satellite navigation system receiver (44) which receives signals from GPS satellites and determines a satellite time standard signal;
   means for periodically actively synchronizing a time signal of said acquisition clock circuit (52) with said satellite time standard signal, so that said clock circuit includes an enabled synchronizing state when synchronizing is occurring and an idle state when no synchronizing of the two signals is occurring; and
   means for turning said satellite navigation system receiver (44) off during idle periods of time when said time signal of said acquisition clock circuit is not being synchronized,
   whereby power consumption of said GPS receiver is conserved and said acquisition clock circuit remain in synchronization with said satellite time standard signal within a predetermined tolerance.

2. The recorder of claim 1 further comprising:
   means for continually collecting said data for a period of time while said acquisition clock is being periodically enabled and while in said idle state.

3. The recorder of claim 2 further comprising:
   means for varying a duty cycle of said satellite navigation system receiver between said idle state and said enabled state so as to maximize the total portion of said period of time at which said satellite navigation system receiver is turned off in said idle state while maintaining accuracy of said acquisition clock circuit with respect to said time standard within said predetermined tolerance.

4. The recorder of claim 3 further comprising:
   means for measuring a first clock drift between said acquisition clock circuit and said time standard that accumulates during a first idle period of said satellite navigation system receiver; and
   means for adjusting the duration of a subsequent idle period of said satellite navigation system receiver as a function of said first clock drift.

5. The recorder of claim 3 further comprising:
   a temperature sensor (80) coupled to said processor; and
   means for adjusting said idle period as a function of a change in temperature.

* * * * *